United States Patent [19]

Mellbom

[11] 4,129,626

[45] Dec. 12, 1978

[54] VAPOR-LIQUID CONTACTING APPARATUS

[75] Inventor: Marvin E. Mellbom, Clarendon Hills, Ill.

[73] Assignee: UOP Inc., Des Plaines, Ill.

[21] Appl. No.: 866,664

[22] Filed: Jan. 3, 1978

[51] Int. Cl.$^2$ .............................................. B01D 3/22
[52] U.S. Cl. ................................ 261/114 JP; 55/246; 261/114 R; 261/114 TC
[58] Field of Search ........ 261/114 R, 114 TC, 114 JP; 52/246

[56] References Cited

U.S. PATENT DOCUMENTS

| | | | |
|---|---|---|---|
| 1,605,263 | 11/1926 | Millard | 261/114 R |
| 1,613,352 | 1/1927 | Kobernik | 261/114 R |
| 1,620,750 | 3/1927 | Bartlett | 261/114 R |
| 1,778,475 | 10/1930 | Wilson et al. | 261/114 R |
| 1,880,525 | 10/1932 | Taylor | 261/114 R |
| 2,202,071 | 5/1940 | Dongen et al. | 261/114 R |
| 2,476,009 | 7/1949 | Wessman | 261/114 TC |
| 2,664,280 | 12/1953 | Kohn | 261/114 TC |
| 2,693,350 | 11/1954 | Ragatz | 261/114 R |
| 2,973,189 | 2/1961 | Chu | 261/114 R |
| 3,338,566 | 8/1967 | Kittel | 261/114 R |

FOREIGN PATENT DOCUMENTS

| | | | |
|---|---|---|---|
| 2020884 | 11/1971 | Fed. Rep. of Germany | 261/114 R |
| 682721 | 11/1952 | United Kingdom | 261/114 JP |

*Primary Examiner*—Frank W. Lutter
*Assistant Examiner*—Gregory N. Clements
*Attorney, Agent, or Firm*—James R. Hoatson, Jr.; John F. Spears, Jr.; William H. Page, II

[57] ABSTRACT

A multipass fractionation tray having at least three chordal inlet and three chordal outlet downcomers alternately spaced along the circular periphery of the tray is presented. Liquid is collected from the contacting surfaces of the tray in a corresponding number of troughs which extend radially from approximately the center of the tray to the outlet downcomers. The troughs may serve as structural members which support the perforated decking plates of the tray and which are attached to a centrally located circular connecting ring.

15 Claims, 8 Drawing Figures

VAPOR-LIQUID CONTACTING APPARATUS

FIELD OF THE INVENTION

The invention relates to the design of a vapor-liquid contacting apparatus. The invention more specifically relates to multipass fractionation trays for use in fractionation columns. Similar types of apparatus may be found in the references classified in Classes 261, 202 and 239.

PRIOR ART

Fractionation trays have been in widespread commercial use for a great time, and there exists a large volume of accumulated knowledge as to the design and construction of fractionation trays. For instance, section 18 of the Fourth Edition of *The Chemical Engineers' Handbook*, McGraw-Hill Book Co., 1963, describes several different types of fractionation trays and presents much design information.

Multipass fractionation trays are also referred to as split-flow trays. Examples of multipass trays are presented in U.S. Pat. Nos. 2,973,189 and 3,434,701. The latter reference also illustrates the use of chordal downcomers. Radial flow of liquid from a central downcomer is shown on page 18-4 of the previously cited *Chemical Engineers' Handbook*.

The prior art multipass fractionation tray typically employs one or more downcomers located in the central portions of the tray and aligned parallel to the chordal downcomers used at the edge of the tray.

BRIEF SUMMARY OF THE INVENTION

The invention provides a multipass fractionation tray which provides equal vapor-liquid contacting on all perforate parts of the tray and which efficiently utilizes available tray surface. The invention also provides a multipass fractionation tray highly suited to the addition and withdrawal of liquid and vapor and the even adjustment of the resulting liquid and vapor flows. The invention in one embodiment provides a multipass fractionation tray in which radially aligned liquid collection troughs serve as a spoked support system which holds the perforated horizontal plates forming the vapor-liquid contacting areas of the tray.

One embodiment of the invention may be broadly characterized as comprising a multipass fractionation tray having at least three chordal inlet downcomers or liquid receiving areas and three chordal outlet downcomers alternately spaced along the circular periphery of a horizontal liquid support plate. Each chordal outlet downcomer is operatively connected to a liquid collection trough which extends radially from a point near the center of the tray. The troughs are preferably inclined below the upper surface of the liquid support plate and have imperforate baffles along the edges of the troughs, which are perpendicular to the chordal outlet downcomers. Each liquid collection trough borders on two vapor-liquid contacting areas and collects liquid from both contacting areas.

For simplicity of presentation and clarity, various minor accessories normally present on fractionation trays such as manways, weep holes, support bars, rings and braces, etc., have not been shown. The design of these accouterments may be as is customary and well known in the art. This presentation of some embodiments of the present invention is not intended to limit from the scope of the invention those other embodiments described herein or which are the result of normal and reasonable modification of the embodiments presented.

Figure 1:
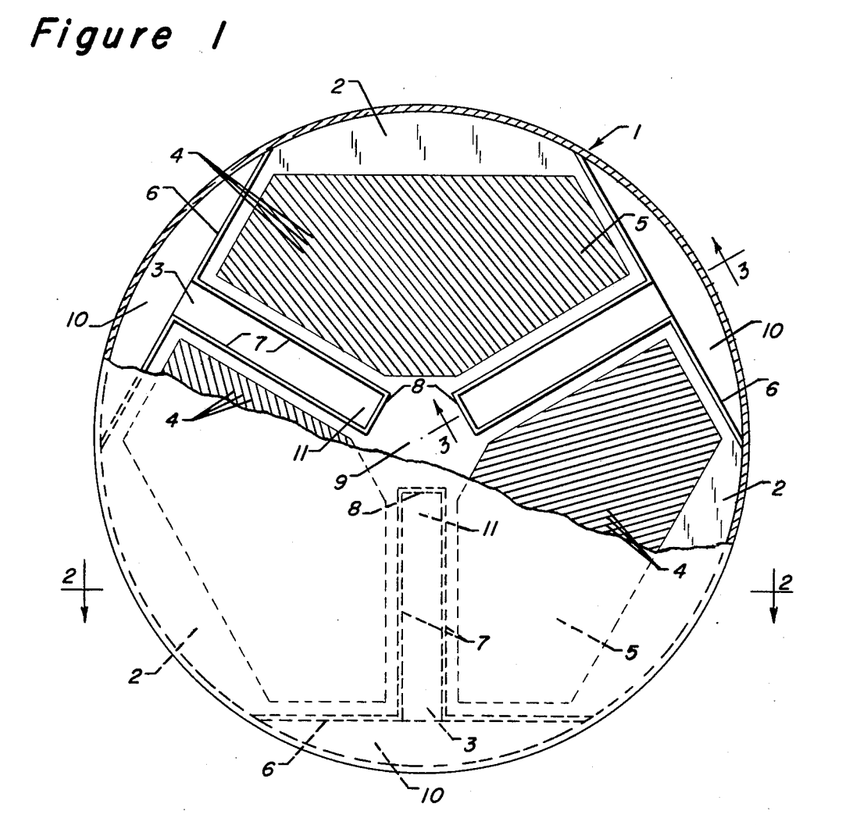
FIG. 1 presents the view seen when looking downward at a fractionation tray constructed according to one embodiment of the invention and mounted in a fractionation column 1.

Referring now to FIG. 1, a three-pass fractionation tray is shown mounted in a horizontal position in a vertical, cylindrical fractionation column 1. Three chordal liquid receiving areas 2 are alternately spaced around the periphery of the liquid support plate with three chordal liquid collection areas 10. The liquid support plate will normally be fabricated from several smaller structural elements to allow easy insertion into the column after the column is erected. These elements may be bolted or welded together. The chordal liquid receiving areas are formed by substantially imperforate areas defined by a chord drawn between two points on the circular periphery of the support plate at the inner surface of the column. Each liquid receiving area preferably has two opposing ends which abut the ends of two different liquid collection areas.

Liquid descends from the tray above and lands upon the liquid receiving areas. It then flows horizontally onto one of the three vapor-liquid contacting areas 5, which are contiguous to the liquid receiving areas. The liquid is intimately contacted by the many vapor streams rising through perforations which are evenly spread across the vapor-liquid contacting areas. A representative portion of the very large number of these perforations 4 is shown on one of the vapor-liquid contacting areas, the preferred shape of which is shown by the light lines which surround these areas. As is customary in the art, the perforations preferably do not extend within close proximity of any of the walls or baffles located in the upper surface of the tray.

The thus-contacted liquid leaves the tray by overflowing the substantially imperforate baffles 7 and entering one of two liquid collection troughs which adjoin each vapor-liquid contacting area. Some of the liquid flows onto the imperforate area 9 located in the center of the tray and then over the vertical partitions 8 located at the inner end of each liquid collection trough. The liquid then flows radially outward to chordal liquid collection areas 10. The liquid travels along the inclined bottom 3 of the troughs into the liquid collection area. It then falls to the chordal liquid receiving area of the next lower tray. Preferably the entire chordal area is left open to allow downward liquid flow. At the outer end of each liquid collection trough, a pair of vertical walls 6 connect the end of the trough to the pointed ends of the chordal liquid collection area. These walls extend a sufficient distance above the upper surface of the liquid support plate to prevent the overflow of liquid thereby causing the liquid to enter the liquid collection troughs.

Figure 2:
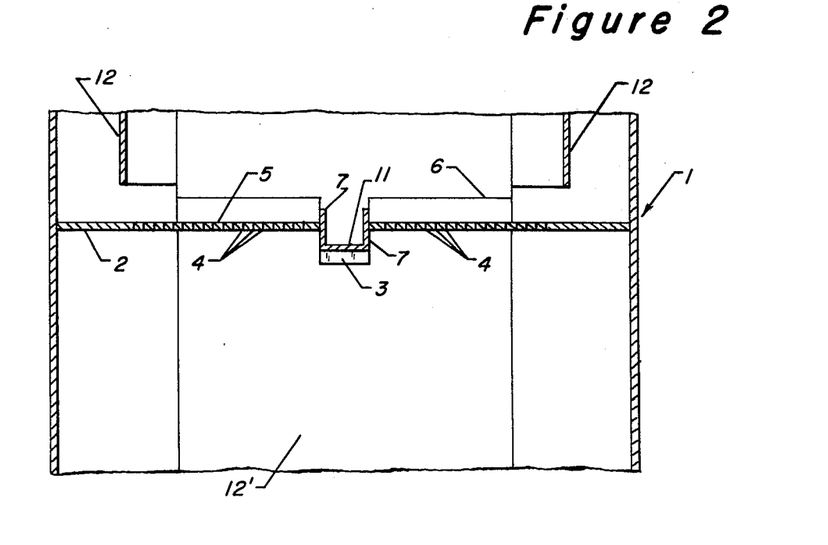
FIG. 2 is a sectional view of a portion of the tray shown in FIG. 1 taken along line 2—2 to illustrate the different elevations of various components of the tray.

FIG. 2 is the sectional view along line 2—2 looking outward toward the curved inner surface of the outer wall of the fractionation column 1 from the center of the column. The liquid descending from the tray above is confined to the downcomers formed by the planar walls 12 and lands upon the chordal liquid receiving areas 2. It then flows across the two vapor-liquid contacting areas 5 located in this portion of the tray. Vapors pass upward through the many perforations 4 located in the vapor-liquid contacting areas. The greater height of vertical walls 6 causes the liquid to preferentially flow over the two vertical baffles 7 which extend along the two opposing sides of the liquid collection trough. In this view, the preferred depression of the trough below the upper surface of the liquid support plate and the preferred incline of the bottom 3 of the trough area both visible. The liquid exits the open outer end of the trough, which coincides with a rectangular notch at the top of the flat wall 12'. The liquid then flows into the liquid collection area at the top of the outlet downcomer.

Figure 3:
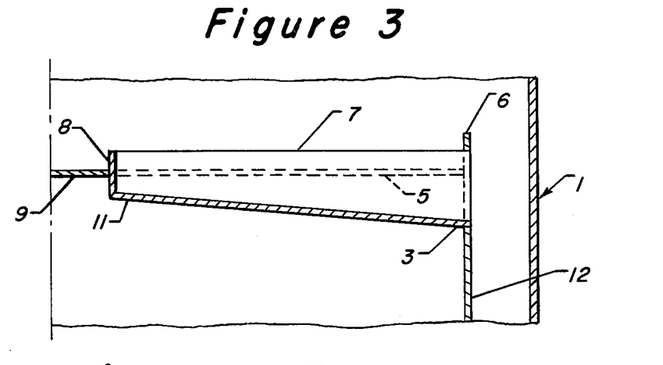
FIG. 3 is a second sectional view of a portion of the tray shown in FIG. 1 and presents details of the liquid collection troughs used in this embodiment.

In FIG. 3, the construction of the liquid collection troughs of FIGS. 1 and 2 is presented in further detail. The trough extends radially outward from an imperforate area 9 located near the center of the tray to an outlet downcomer formed by the flat wall 12 and the inner surface of the wall of the column 1. The inner end of the trough is sealed by the partition 8. The longer side of the rectangular trough is enclosed by one of the baffles 7, which may be part of a vertical wall extending to the lower surface 11 of the bottom of the trough. The upper horizontal edge of the vertical wall 6 is located at a higher elevation than baffle 7, with the wall 6 being perpendicular to the baffle 7 and to the trough.

Figure 4:
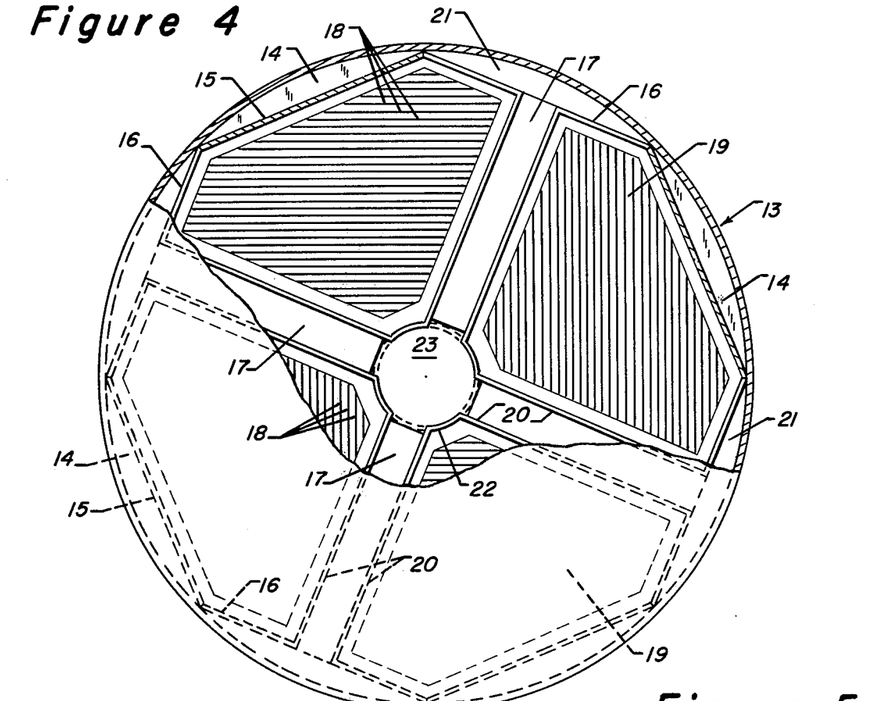
FIG. 4 illustrates a different embodiment of the invention in which interconnected liquid collection troughs divide the tray area into four segregated liquid-vapor contacting areas.

FIG. 4 presents a four-pass fractionation tray in which another embodiment of the present invention is incorporated. The view is a cross-section of the column taken on a horizontal plane a sufficient distance above the illustrated tray to intersect the inner walls 15 of the downcomers carrying liquid from the tray above. The outer wall 13 of the column surrounds the substantially circular liquid support plate. Four chordal liquid receiving areas 14 and four chordal liquid collection areas 21 alternate around the periphery of the liquid support plate. Four vapor-liquid contacting areas 19 are each partially encircled by the vertical baffles 20, each of which extends along two different liquid collection troughs, and the two vertical walls 16 which extend inward from an outer end of the corresponding liquid collection area to the baffle. In this embodiment, the bottom surface 17 of each liquid collection trough is not inclined toward the outer end of the trough. Each vapor-liquid contacting area has a large number of perforations 18, only a portion of which are shown. In this embodiment, the imperforate area 23 located in the center of the tray is partially enclosed by the four baffles 20 and therefore isolated from the vapor-liquid contacting areas. The baffles have central curved sections 22 which lessen liquid flow into the open inner ends of the liquid collection troughs.

Figure 5:
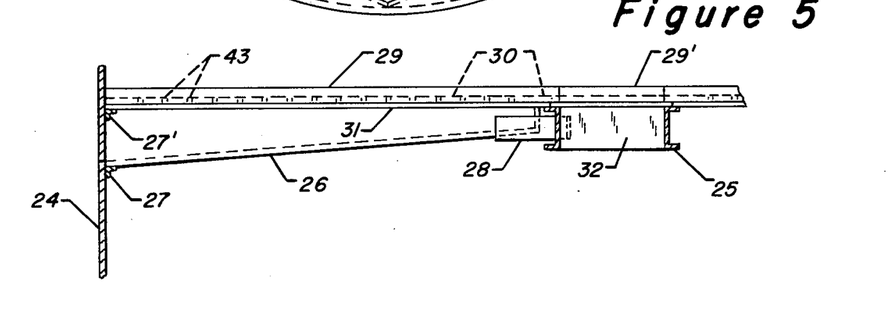
FIG. 5 is a sectional view looking horizontally toward the side of a liquid collection trough which, according to the preferred embodiment of the invention, supports the perforated plates of a tray.

FIG. 5 presents a detailed view of a liquid collection trough 26, which in accordance with the preferred embodiment of the invention is utilized as a support member for the perforated decking sheets 30. The outer end of the trough is mounted to a vertical outlet downcomer wall 24. The trough has a pair of horizontal lips 31 along the upper edge of its longer sides. A portion of these lips rest on a support 27' at the downcomer wall, and the bottom of the trough rests on a support 27. The preferred slope of the bottom of the trough may be seen in this view. The inner end of the liquid collection trough is mounted to a stiffened connecting ring 25 by gussets 28 or by other means. The lips of the trough extend inward beyond the bottom surface of the trough to overlap the upper horizontal shoulder at the top of the connecting ring. Alternatively, the trough may be bolted or welded directly to the connecting ring. A straight weir 29 runs parallel to and preferably directly above the vertical sides of the trough. A curved vertical weir 29' traces the intermediate portions of the shoulder of the connecting ring, which is covered by an imperforate decking plate. Circular perforations 43 are evenly located across the vapor-liquid contacting area of the tray. The outer end of the trough communicates with the internal volume of the downcomer through a rectangular notch in the upper surface of the downcomer wall.

Figure 6:
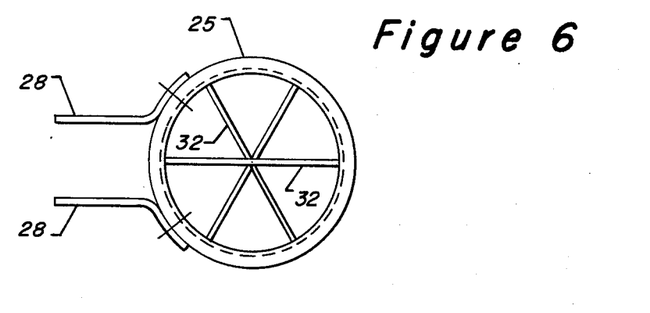
FIG. 6 is the view seen looking downward at the preferred cylindrical stiffener or connecting ring used in the center of the tray in conjunction with the trough shown in FIG. 5.
Figure 8:
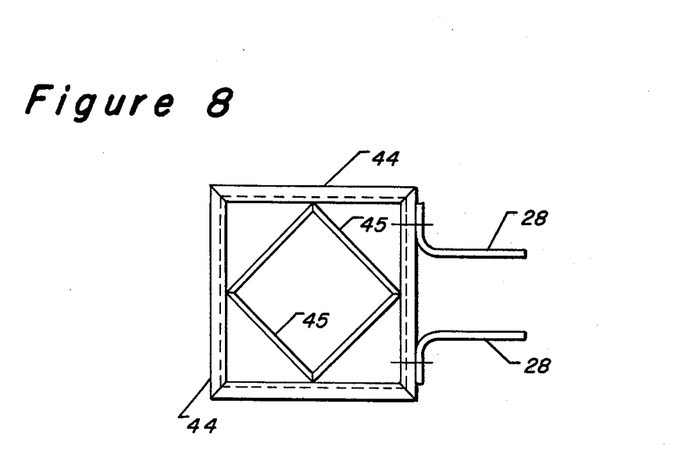
FIG. 8 is the view seen looking downward at a square trough connecting means.

FIG. 6 shows the stiffened connecting ring 25 as seen from above. The radial braces 32 are welded across the vertically aligned cylindrical opening in the center of the ring. The gussets 28 are welded or bolted to both the sides of the trough and the outer surface of the ring. The inner ends of each liquid collection trough are thereby mounted to the ring. FIG. 8 presents an alternative structure for this element of the invention and may be used with four liquid collection troughs. This square connecting means 44 also has braces 45 to increase its rigidity.

Figure 7:
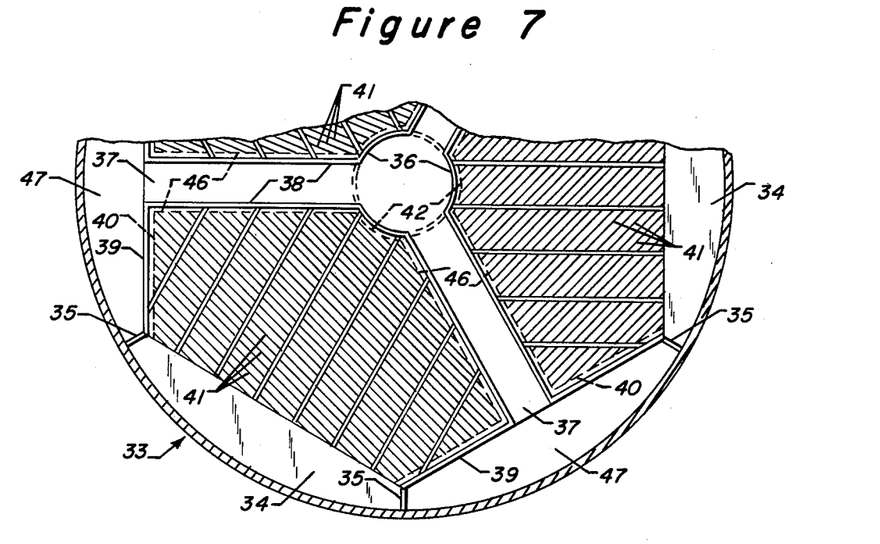
FIG. 7 is the view seen looking downward at a portion of a fractionation tray utilizing the liquid collection troughs as support members.

In FIG. 7, another embodiment of the invention utilizing the liquid collection troughs as support members is provided. The planar vertical downcomer walls 39 are mounted to the inner surface of the outer wall 33 of the vessel through use of the vertically aligned extension walls 35. These imperforate extension walls or brackets extend radially inward to meet the vertical edges of the downcomer walls. Preferably, their total height is substantially equal to that of the downcomer wall. Imperforate horizontal liquid support platforms 34 located between adjacent outlet downcomer walls are at the bottom of the inlet downcomers carrying liquid from the tray immediately above. The liquid flows inward from receiving areas formed by these platforms across the vapor-liquid contacting areas 41 formed by sections of perforated decking. The perforated decking rests on the brackets 40 mounted on the outlet downcomer walls and on the horizontal lips 46 on the top of the sides of the troughs 37. The circular shoulder 42 of the circular connecting ring also supports an edge of some of the perforated decking plates. Curved weirs 36 connect the weirs 38, which are located directly above the sides of the liquid collection troughs. The outlet downcomer walls extend upward above the upper horizontal edges of the weirs 38 except at rectangular notches at the outer ends of the liquid collection troughs. The liquid flows over the weirs and transits the trough to enter the open upper end of an outlet downcomer 47, and then falls to a lower tray.

DETAILED DESCRIPTION

Fractionation trays are in widespread use in the chemical, petrochemical and petroleum industries and form a basic element of the apparatus used in many separatory processes. Those skilled in the art are therefore well versed in the design, construction and use of various types of fractionation trays.

As the capacity and size of fractionation columns has been increased to accommodate the larger flow rates found in modern industrial processes, certain problems have arisen. These include inadequate weir lengths and downcomer areas, resulting in an imbalance of weir length, downcomer area and vapor-liquid contacting surface. This in turn causes a corresponding drop in tray efficiency. In an attempt to lessen or eliminate these problems, multipass fractionation trays have been used. These are fractionation trays having more than one liquid flow path across the surface of the tray. They therefore have more than one inlet or outlet downcomer associated with each tray.

Multipass fractionation trays present their own set of design problems. One of these is assuring equal liquid flow in the areas of the tray served by the different inlet downcomers. Another is providing a mechanical design which does not obstruct or distort the flow of vapor in different areas of the tray. A third consideration is the ability to add or withdraw a liquid or vapor stream without creating unequal liquid or vapor loadings or flows on different portions of the tray. It is an objective of this invention to provide a multipass fractionation tray. It is another objective to provide a multipass fractionation tray which allows the facile addition and withdrawal of liquid or vapor. A third objective of the invention is to provide a multipass fractionation tray having an efficient balance of weir length, downcomer area and vapor-liquid contacting surface which allows equal liquid and vapor distribution in each contacting area, thus maximizing tray efficiency.

In referring to the structure of the tray, various words and phrases which are unique to the art of fractionation tray design area used herein. It is intended that the normal meaning attached to these words in the art be retained unless otherwise specified. Accordingly, the term "inlet downcomer" is intended to refer to the total downcomer structure which delivers or directs liquid downward in an enclosed vertical path to the specific tray under consideration. An inlet downcomer need not be connected to the lower tray except for the continuous wall of the column which is normally used to form part of the downcomer. The term "outlet downcomer" refers to a vertical conduit or device for removing liquid from the tray under consideration.

The term "inner" is used to describe that portion of an item which is closer to the vertical major axis which passes downward through the center of the fractionation column. Unless otherwise specified, distance is measured along a radius extending outward horizontally from this major axis. The adjective "chordal" is used herein to describe certain structural elements and areas. It is intended to refer to an area or element located near the periphery of a tray and which has a straight inner edge coextensive with a chord drawn across the tray and a curved edge conforming to, but not necessarily abutting, the inner surface of the outer wall of the column.

Fractionation trays normally cover or close off substantially all of the horizontal cross-sectional area of a fractionation column. The largest portion of this area is covered by some form of a horizontal liquid support plate or similar structure. The outer edge of the support plate preferably contacts either an outlet downcomer or the inner surface of the outer wall of the column in a substantially liquid-tight seal. The edge of the plate often rests on brackets welded to the wall. The liquid support plate is designed to retain liquid on the upper surface of the tray. Accordingly, the support plate is substantially unperforated except for a predetermined number of vapor passageways located on the vaporliquid contacting areas of the tray and any drainholes which may be desired. During proper use of the tray, vapor is passing upward through the perforations provided in the vapor liquid contacting area at a sufficient rate to prevent the downward passage of liquid.

The liquid support plate can be constructed in several ways. Most commonly it is formed by a number of smaller plates of differing shapes which are supported by a framework extending horizontally across the internal volume of the fractionation column. It is customary to assemble the trays within the column after the column has been erected. The supporting framework may be bolted or welded to the inside surface of the column, and the smaller plates or decking rest upon this framework and may be secured to it. The periphery of the liquid support plate is normally circular except for those areas utilized as outlet downcomers, and which therefore are left uncovered to provide an opening to the tray below. The periphery of the liquid support plate is therefore referred to as substantially circular to allow for the small missing chordal portions, which give the total liquid support plate a somewhat cam-like appearance.

Those portions of the tray's surface area which are used for either inlet or outlet downcomers are held to a minimum in order to provide the maximum possible amount of surface area for the vapor-liquid contacting areas. Therefore, in one embodiment of the invention, the chordal liquid receiving areas and/or the chordal liquid collection areas are shorter, when measured along the straight length of the chord, than they would be if the opposing ends of two areas adjoined one another. By way of example, the tray shown in FIG. 1 is laid out to provide six chords of equal length which completely surround the center of the tray. In the alternative embodiment being considered here, a tray designed for use in the same column would have shorter chords which would be spaced from one another at their ends. The chords would therefore not completely surround the center of the tray.

Another variation in the structure of the downcomers is shown in FIG. 7. In this embodiment, the liquid collection and liquid receiving areas only extend along a segment of the length of the chord. This provides a larger downcomer volume and is preferred when the column is to be operated with relatively high liquid flow rates. It is believed that the absence of pointed ends on the downcomers will promote a more uniform liquid residence time upon the tray and will therefore be advantageous.

The vapor-liquid contacting area may extend across the center of the tray instead of the imperforate area shown in FIG. 1. However, preferably several separate vapor-liquid contacting areas of approximately equal size are symmetrically located on the liquid support plate. These areas may utilize any of the many known mechanical arrangements, such as bubble caps, for promoting intimate contacting of the rising vapor phase with the retained liquid, but preferred vapor-liquid contacting area structure is that of a sieve-type tray. The contacting areas are therefore preferably devoid of any contacting aids and are formed by the flat upper surface of the liquid support plate and a large number of perforations. These perforations are preferably circular and may range from about 0.3 to 3.8 cm in diameter. Slots and other shaped openings may be used. The total open area of the tray, that is the total area of all the perforations, will be set by the customary design considerations based on the upward flow rate of the vapor phase.

It is preferred that no seal pot or inlet weir be present at the bottom of the inlet downcomers. These devices could, however, be used. The preferred downcomer design comprises the extension of the planar wall (12 in FIG. 2) downward to within close proximity of the upper surface of the liquid support plate. This is a customary downcomer design which is used commercially. The distance between the planar wall of the downcomer and the upper surface of the tray should be uniform and should be small enough to cause the retention of about 12 to 30 centimeters of clear liquid within the bottom of the downcomer at the normal liquid flow rate. This liquid provides a seal which prevents vapor from rising through the downcomer. It also more evenly distributes the liquid flowing out of the downcomer.

The liquid collection troughs are preferably aligned with a radius extending from the vertical major axis of the column to the periphery of the tray. The outer ends of the troughs are preferably located at the center of the outlet downcomer. The bottom of each trough is preferably inclined so that it is lower at an open outer end where it connects to the downcomer wall at the chordal liquid collection area. The slope of the bottom of the troughs is preferably from about 1 to 15 degrees from horizontal. Liquid which falls into the trough therefore is caused to flow to the liquid collection area of the outlet downcomer. The bottoms of the trough may, however, be level if desired. The bottom of the troughs should normally be below the upper surface of the vapor-liquid contacting areas. This is to provide a sufficient cross-sectional area to allow the liquid phase to easily drain from the tray after spilling over weirs or baffles along the sides of the troughs. The bottom of the liquid collection troughs is therefore preferably located from about 5 to 25 cm below the upper surface of the tray at the inner end of the tray.

The baffles on the longer sides of the liquid collection troughs may be attached to the upper surface of the decking which forms the liquid support plate. The baffles may also be formed by extending the longer side walls of the trough upward above the decking. They should extend above the upper surface for a distance equal to the minimum liquid level which it is desired to retain on the tray. The baffles will therefore normally have an upper horizontal edge at least 2.5 cm above the upper surface of the tray.

A variation in the structure of the troughs is shown in FIG. 4. The four troughs shown in this diagram are interconnected across the center of the tray by curved weirs which join the baffles extending along the longer sides of two different liquid collection troughs. The imperforate section of the tray inside the curved weirs is at the same level as the vapor-liquid contacting areas. The inner ends of the troughs are not sealed by a vertical partition. The outer end of each baffle forms a liquid-tight seal at the notch-shaped opening in the vertical imperforate wall located at the outer end of the trough. These imperforate vertical walls are aligned with the straight edge of the chordal liquid collection area. Preferably, they are formed by extending portions of the outlet downcomer wall upward above the upper surface of the tray. The outer end of the liquid collection trough communicates with the internal volume of the downcomer through a rectangular notch which is approximately the same width as the trough. The walls at the outlet end of the trough should extend at least three centimeters above the upper edge of the baffles along the sides of the trough to ensure that liquid flows across the vapor-liquid contacting area rather than bypassing it.

In accordance with this description, the invention may be characterized as a multi-pass vapor-liquid contacting tray which comprises: a horizontal liquid support plate having a substantially circular periphery and an upper surface and which is adapted to retain a body of liquid upon the upper surface; at least three chordal imperforate liquid receiving areas alternately spaced along the periphery of the liquid support plate with an equal number of chordal liquid collection areas, with each chordal liquid collection area and each chordal liquid receiving area having a first and a second end; a plurality of liquid collection troughs dividing the liquid support plate into an equal number of vapor-liquid contacting areas, the liquid collection troughs being equal in number to the number of chordal liquid collection areas, with each liquid collection trough extending radially outward to a single chordal liquid collection area, and with each liquid collection trough having an open top which is partially surrounded by two substantially imperforate vertical baffles extending upward from the upper surface of the liquid support plate along two opposing sides of the liquid collection trough; and, a pair of substantially imperforate vertical walls rising above the upper surface of the liquid support plate and located along a chordal edge of each of the chordal liquid collection areas, with one of the pair of vertical walls extending horizontally from one of the vertical baffles associated with the liquid collection trough which abuts the chordal liquid collection area to each of the first and second ends of the chordal liquid collection area, and with the vertical walls extending a greater distance above the upper surface of the liquid support plate than the vertical baffles associated with the liquid collection trough.

If an imperforate area is provided at the center of the tray, it may be used to charge liquid to the surface of the tray. It is well suited to this because it is in open communication with and equidistant to all of the vapor-liquid contacting areas. The liquid flows onto all contacting areas of the tray should therefore be equivalent. This is an advantage over multipass tray designs which require liquid feed streams to be evenly divided, as by a branching conduit, and then charged to different locations on the tray. The central imperforate area may also be used to remove all or a portion of the liquid flowing across the tray. This central area may be depressed below the upper surface of the liquid support plate to aid in the collection of liquid. The structure of the feed or withdrawal trays may differ from that of the other trays in a column. The injection and withdrawal of vapor is also easily facilitated at the center of the subject tray.

The area in the center of the tray may also be used for the support of the tray by a vertical brace extending downward to the surface of the next tray below. This allows the minimization of horizontal braces underneath the contacting areas of the tray, which tend to obstruct vapor passageways and cause other difficulties. It may also allow a reduction in tray spacing. However, it is preferred that the trays are self-supporting and that no such vertical braces be used at the center of the tray.

Another advantage of the subject tray design is that it provides an average liquid flow path which is greater in length than the conventional cross-flow type of tray. This is an advantage since it increases the efficiency of the fluid contacting. Other advantages of the tray will be recognized by those skilled in the art.

In the preferred embodiment of the invention, the liquid collection troughs form the rigid horizontal members of a spoked support system which supports the decking of the liquid support plate. This horizontal support system rests on supports located at the vertical walls of the outlet downcomers or is in some other way attached to these walls. The inner end of each liquid collection trough is mounted either directly or through some intermediate connecting element to a centrally located connecting means. This attachment is by welding or some other relatively permanent and inflexible method. The central connecting means is preferably circular as this shape allows it to more readily accept the stress and strain placed upon it. When connected in this manner the troughs and the cylindrical connecting means will appear as the hub and spokes of a wheel when viewed from above. Triangular or square connecting means may also be used, if desired.

The various pieces of decking which form the vapor-liquid contacting areas and other parts of the liquid support plate rest directly on the horizontal upper edges of the troughs and the connecting means. Preferably, these upper edges have widened horizontal lips or shoulders from about 2 to 10 centimeters wide. The baffles along the sides of the liquid collection trough and the curved weirs at the center of the tray may be placed on top of the decking. The chordal imperforate liquid platforms located directly under the inlet downcomers may be supported in part by the troughs, but will also be supported by a horizontal lip attached to the inner surface of the column. The joints between adjoining pieces of decking may be sealed by a system of overlapping edges or other suitable means.

This preferred embodiment of the invention may be broadly characterized as a fractionation apparatus which comprises a vertically aligned cylindrical outer vessel having a cylindrical inner surface and a cylindrical internal volume; three vertically aligned planar downcomer walls located at substantially equal elevations within the internal volume of the outer vessel, each of the downcomer walls having two vertical edges which are mounted to the inner surface of the outer vessel at substantially equidistant points; three liquid collection troughs, each trough having a first end mounted on a separate downcomer wall at a central point of the downcomer wall, with the liquid collection trough being substantially perpendicular to the downcomer wall, each trough having a second end and a pair of substantially horizontal support lips extending from the first to the second end of the liquid collection troughs, and with the three liquid collection troughs being at substantially equal elevations within the outer vessel; a connecting means centrally located within the internal volume of the outer vessel at substantially the same elevation as the liquid collection troughs and connected to the second end of the three liquid collection troughs to provide a spoked support system extending across the internal volume of the outer vessel; a plurality of substantially horizontal perforated decking sheets forming a horizontal liquid support plate which rests upon the spoked support system and has three vapor-liquid contacting areas; a series of imperforate vertical baffles or weirs extending above the liquid support plate along the support lips of the liquid collection troughs and from the first end of the liquid collection troughs to the vertical edges of each downcomer wall; and, three substantially imperforate chordal horizontal liquid support platforms which adjoin a portion of the inner surface of the outer vessel and a vapor-liquid contacting area of the liquid support plate and which are located between the vertical edges of adjacent downcomer walls.

Acceptable specific dimensions for the various elements of the invention may be determined by using well established guidelines and generally accepted tray design standards. The liquid collection troughs and the connecting means will have to be designed to support the weight of the tray and the liquid on the tray. This will be roughly equivalent to the load placed on the prior art support system for a similar tray size and liquid loading. The tray may be operated in the same manner as other multipass trays. Both the design and operation of the tray will have to be matched to the characteristics of the fluids being contacted in accordance with the standard design methods. Standard materials of construction such as carbon or stainless steel may be used.

The use of three or four liquid collection troughs and chordal liquid collection areas is preferred. The inventive concept is, however, not so limited and may be applied to trays providing five or more passes through the use of five or more downcomers. The inventive concept is also not limited to the fractionation of hydrocarbons or other distillable mixtures. It may be applied to other vapor-liquid contacting operations in which countercurrent flow is used. These include amine scrubbing to remove acid gases or the purification of a hydrogen-containing gas stream by the absorption of light paraffins into a lean oil.

I claim as my invention:

1. A multi-pass vapor-liquid contacting tray which comprises:
    (a) a horizontal liquid support plate having a substantially circular periphery and an upper surface and which is adapted to retain a body of liquid upon the upper surface;
    (b) at least three chordal imperforate liquid receiving areas alternately spaced along the periphery of the liquid support plate with an equal number of chordal liquid collection areas, with each chordal liquid collection area and each chordal liquid receiving area having a first and a second end;
    (c) a plurality of liquid collection troughs dividing the liquid support plate into a number of vapor-liquid contacting areas, the liquid collection troughs being equal in number to the number of chordal liquid collection areas, with each liquid collection trough extending radially outward to a single chordal liquid collection area, and with each liquid collection trough having an open top which is partially surrounded by two substantially imperforate vertical baffles extending upward from the upper surface of the liquid support plate along two opposing sides of the liquid collection trough; and, (d) a pair of substantially imperforate vertical walls rising above the upper surface of the liquid support plate and located along a chordal edge of each of the chordal liquid collection areas, with one of the pair of vertical walls extending horizontally from one of the vertical baffles associated with the liquid collection trough which abuts and is in fluid flow communication with the chordal liquid collection area to each of the first and second ends of the chordal liquid collection area, and with the vertical walls extending a greater distance above the upper surface of the liquid support plate than the vertical baffles associated with the liquid collection trough.

2. The apparatus of claim 1 further characterized in that a first end of each chordal liquid receiving area abuts a first end of a chordal liquid collection area.

3. The apparatus of claim 1 further characterized in that there are four chordal liquid receiving areas, four chordal liquid collection areas and four liquid collection troughs.

4. The apparatus of claim 1 further characterized in that each liquid collection trough has an inner end located away from the chordal liquid collection area and which is sealed by a vertical partition extending upward from the upper surface of the liquid support plate and extending horizontally between the vertical baffles located along the two opposing sides of the liquid collection trough.

5. The apparatus of claim 4 further characterized in that the vertical partition is perpendicular to the vertical baffles located along the two opposing sides of the liquid collection trough and in that the liquid collection trough has a rectangular shape when viewed from above.

6. The apparatus of claim 1 further characterized in that an imperforate area is centrally located on the upper surface of the liquid support plate and in that the liquid collection troughs extend radially outward from this imperforate area.

7. The apparatus of claim 6 further characterized in that one of the vertical baffles located along one of the two opposing sides of a first liquid collection trough extends across the upper surface of the liquid support plate and along one side of a second liquid collection trough, and in that the vertical baffle located along the opposing side of the first liquid collection trough extends across the upper surface of the liquid support plate and along one side of a third liquid collection trough.

8. The apparatus of claim 7 further characterized in that each liquid collection trough has a bottom surface which is depressed to a level below the upper surface of the liquid support plate along an incline having a lower end located at the chordal liquid collection area.

9. A vapor-liquid contacting apparatus which comprises:

(a) a vertically aligned cylindrical vessel having a cylindrical inner surface and a cylindrical internal volume;

(b) three vertically aligned planar downcomer walls having upper ends located at substantially equal elevations within the internal volume of the vessel, each of the downcomer walls having two vertical edges which are mounted to the inner surface of the vessel;

(c) three liquid collection troughs, each trough having a first end mounted on a separate downcomer wall at a central point of the downcomer wall, with the liquid collection trough being substantially perpendicular to the downcomer wall, each trough having a second end and a pair of substantially horizontal support lips extending from the first to the second end of the liquid collection troughs, and with the three liquid collection troughs being at substantially equal elevations within the vessel;

(d) a connecting means centrally located within the internal volume of the vessel at substantially the same elevation as the liquid collection troughs and connected to the second end of the three liquid collection troughs to provide a spoked support system extending across the internal volume of the vessel;

(e) a plurality of substantially horizontal perforated decking sheets forming a horizontal liquid support plate which rests at least in part upon the spoked support system and has three vapor-liquid contacting areas;

(f) a series of imperforate vertical baffles extending above the liquid support plate along the support lips of the liquid collection troughs and from the first end of the liquid collection troughs to the vertical edges of each downcomer wall; and, (g) three substantially imperforate chordal horizontal liquid support platforms, each of which adjoin a portion of the inner surface of the vessel and a vapor-liquid contacting area of the liquid support plate and which are located between the vertical edges of adjacent downcomer walls.

10. The apparatus of claim 9 further characterized in that a portion of the perforated decking sheets have edges which rest on the support lips of the liquid collection troughs.

11. The apparatus of claim 10 further characterized in that each liquid collection trough has a bottom surface which is lower in elevation than the liquid support plate and which slopes downward from the second end of the liquid collection trough to the first end of the liquid collection trough.

12. The apparatus of claim 11 further characterized in that the vertical edges of downcomer walls are mounted to the inner surface of the vessel by vertically aligned substantially imperforate brackets which extend radially inward from the inner surface of the outer vessel to the vertical edges of the downcomer walls.

13. The apparatus of claim 11 further characterized in that the connecting means comprises a vertically aligned cylinder which is covered by an imperforate plate and which has horizontal curved support lips extending outward, and in that portions of the perforated decking sheets rest upon the curved support lips.

14. The apparatus of claim 13 further characterized in that the first end of each liquid collection trough is mounted on a downcomer wall at a rectangular notch in the downcomer wall which extends downward from a horizontal upper edge of the downcomer wall, with the upper edge of the downcomer wall being located at an elevation above the imperforate vertical weirs along the liquid collection trough, and with the rectangular notch extending below the elevation of the liquid support plate and coinciding with the bottom surface and sides of the liquid collection trough at the first end of the liquid collection trough.

15. The apparatus of claim 9 further characterized in that the vertical edges of the downcomer walls abut the inner surface of the vessel.

* * * * *